United States Patent
Varela et al.

(10) Patent No.: US 7,204,339 B2
(45) Date of Patent: Apr. 17, 2007

(54) VEHICLE WHEEL END ASSEMBLY WITH WHEEL ADAPTER

(75) Inventors: Tomaz Dopico Varela, Gahanna, OH (US); Chihping Kuan, Rochester Hills, MI (US); John K. Ma, Rochester, MI (US); William C. Sullivan, Newark, OH (US); Edward J. Eshelman, Rochester Hills, MI (US); Dean M. House, Pataskala, OH (US); John L. Bennett, Fraser, MI (US); Mark C. Smith, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 1045 days.

(21) Appl. No.: 10/153,121

(22) Filed: May 22, 2002

(65) Prior Publication Data
US 2003/0218375 A1 Nov. 27, 2003

(51) Int. Cl.
*B60K 17/04* (2006.01)
(52) U.S. Cl. .................................................. 180/371
(58) Field of Classification Search ................ 180/371, 180/372
See application file for complete search history.

(56) References Cited

U.S. PATENT DOCUMENTS

| 1,605,065 | A |   | 11/1926 | Rackham |
|---|---|---|---|---|
| 3,150,531 | A |   | 9/1964 | Singer |
| 6,148,968 | A |   | 11/2000 | Davison |
| 6,811,514 | B2 | * | 11/2004 | Bowman ............... 475/338 |

OTHER PUBLICATIONS

European Search Report, Sep. 13, 2004.

* cited by examiner

*Primary Examiner*—Faye M. Fleming
(74) *Attorney, Agent, or Firm*—Carlson, Gaskey, & Olds

(57) ABSTRACT

A wheel end assembly includes an output shaft that is directly mountable to a wheel adapter to drive a vehicle wheel. A gear assembly is coupled to the output shaft to transfer driving force from an input to the output shaft. The gear assembly includes an output gear that is directly coupled to the output shaft. Thus, the wheel adapter and output gear are both supported directly on the output shaft. The gear assembly and output shaft are substantially enclosed within a housing that is mounted to a non-rotating vehicle component. The output shaft is solely supported by a pair of bearings for rotation relative to the housing. The bearings are installed for direct engagement with the output shaft and housing.

22 Claims, 3 Drawing Sheets

VEHICLE WHEEL END ASSEMBLY WITH WHEEL ADAPTER

BACKGROUND OF THE INVENTION

This invention relates to wheel end assembly, and more particularly to a wheel end assembly for an inverted portal axle as used in a mass transit vehicle.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time during stops and facilitates boarding for all passengers, especially for elderly and disabled passengers as well as for children.

Mass transit vehicles typically have several axles that support, drive and steer the vehicle. Many such vehicles provide a rigid axle having an input positioned off-center near one wheel end to form an inverted portal axle configuration. The input to the portal axle rotates about a longitudinal axis and is typically low to the ground to allow the vehicle floor to be as low as possible. The output to the wheels defines a lateral axis that is vertically higher than the longitudinal axis for the input.

This inverted portal axle includes a short axle shaft member that drives the wheel end near the input and a long axle shaft member that drives the opposite wheel end. The portal axle further includes a pair of gear assemblies, one gear assembly positioned at each wheel end, to raise driving input from each of the axle shafts up to the vertically higher output position at the wheels. Typically this gear assembly includes a gear housing, an input gear driven by the respective axle shaft, an output gear for driving the wheel, and a pair of idler gears in meshing engagement with the input and output gears.

The output gear drives a wheel shaft that is enclosed within a spindle that is mounted to the gear housing. A wheel hub is mounted for rotation relative to the spindle and receives driving input from the wheel shaft. A brake spider is also mounted to the gear housing to support a brake input member. This traditional configuration incorporates at least three bolted joints and four bearings to support the rotating components. Assembly time and overall component cost is significant due to the large number of components and complexity of this configuration.

Accordingly, it is desirable to provide a simplified wheel end assembly for a portal axle configuration to reduce cost and assembly time in addition to overcoming the other deficiencies in the prior art discussed above.

SUMMARY OF THE INVENTION

A wheel end assembly includes a rotating wheel shaft that is directly engaged to a gear assembly component at one end and directly connected to a wheel adapter at an opposite end. The gear assembly transfers driving torque from a central vehicle input to a vehicle wheel end. The gear assembly includes an output gear that is mounted for rotation with the wheel shaft. The output gear drives the wheel shaft, which in turn rotates the wheel adapter.

In the preferred embodiment, the wheel end assembly includes a non-rotating component that is mounted to a vehicle structure, such as a frame or suspension component. A wheel shaft is mounted for rotation relative to the non-rotating component. A gear assembly is coupled to an input shaft and includes an output gear that directly drives the wheel shaft. A wheel adapter is also directly supported on the wheel shaft and is mountable to a vehicle wheel. A pair of bearings provides the sole support for the rotating wheel shaft. The bearings are mounted for direct engagement with the non-rotating component and the wheel shaft.

In one disclosed embodiment, the non-rotating component is a housing that substantially encloses both the gear assembly and the wheel shaft. A brake spider for supporting a brake input component, is also integrally formed with the housing as one piece. One bearing supports the wheel shaft at an inboard end of the shaft near the output gear and the other bearing supports the wheel shaft at an output end of the shaft near the wheel adapter.

In another disclosed embodiment, the non-rotating component is a housing that substantially encloses both the gear assembly and the wheel shaft. A brake spider for supporting a brake input component is separately mounted to the housing. This configuration provides brake clocking flexibility.

In another disclosed embodiment, the non-rotating component is a shaft housing that substantially surrounds the center portion of the wheel shaft. An inboard end of the wheel shaft extends into a gear assembly housing and an outboard end of the wheel shaft extends out of the shaft housing for attachment to the wheel adapter. A brake spider is integrally formed with the shaft housing as one piece.

In another disclosed embodiment, the non-rotating component is a shaft housing or a combination shaft-gear housing as described above and additionally includes a brake rotor that is mountable outboard of the wheel shaft an inboard of the wheel adapter. This configuration allows the brake rotor to be replaced without affecting the bearings.

The subject invention provides a simplified wheel assembly that significantly reduces assembly time and overall cost. These and other features of the present invention can be best understood from the following specifications and drawings, the following of which is a brief description.

DETAILED DESCRIPTION OF A PREFERRED EMBODIMENT

Figure 1:
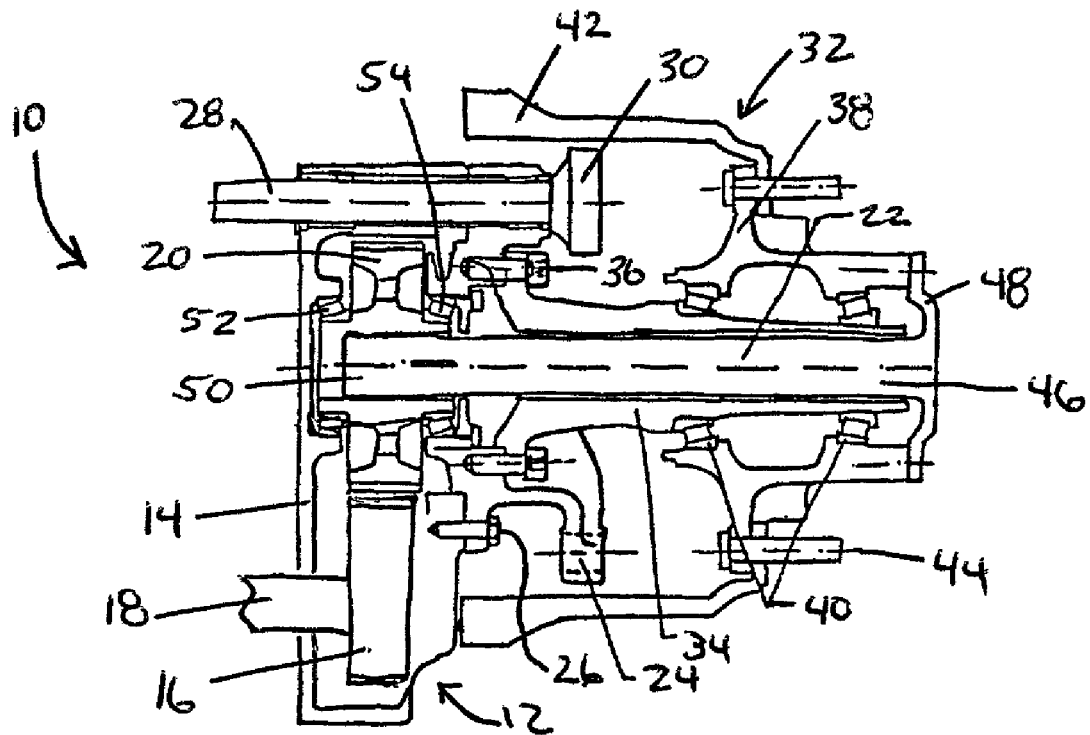
FIG. 1 is a cross-sectional view of a prior art wheel end assembly.

A wheel end assembly for a traditional inverted portal axle configuration is shown generally at 10 in FIG. 1. This traditional wheel end assembly includes a gear assembly 12 including a gear housing 14, an input gear 16 coupled to an input shaft 18, and an output gear 20 for driving a wheel shaft 22. The gear assembly 12 also includes a pair of idler gears (not shown), which react between the input gear 16 and output gear 20 to transfer driving torque from the input shaft 18 to the wheel shaft 22. The input shaft 18 receives driving input from a vehicle engine/transmission via a central gear assembly in an inverted portal axle configuration as known. The inverted portal axle configuration and operation of the gear assembly is well known in the art and will not be discussed in further detail.

A brake spider 24 is bolted to the gear housing 14 with a first plurality of fasteners 26. The brake spider 24 supports a camshaft 28 with a cam 30 at one end for actuating a drum brake assembly 32.

A spindle 34 is bolted to the brake spider 24 with a second plurality of fasteners 36. A wheel hub 38 is mounted for rotation relative to the spindle 34 on a pair of bearings 40. The drum brake assembly 32 includes a brake drum 42 that is bolted to the wheel hub 38 with a third plurality of fasteners 44.

At an outboard end 46, the wheel shaft 22 includes a flanged end 48 that is directly connected to the wheel hub 38. The output gear 20 is splined or similarly attached to the wheel shaft 22 at an inboard end 50. A first bearing 52 provides rotational support between the output gear 20 and the gear housing 14 and a second bearing 54 provides rotational support between the output gear 20 and the brake spider 24.

Figure 2:
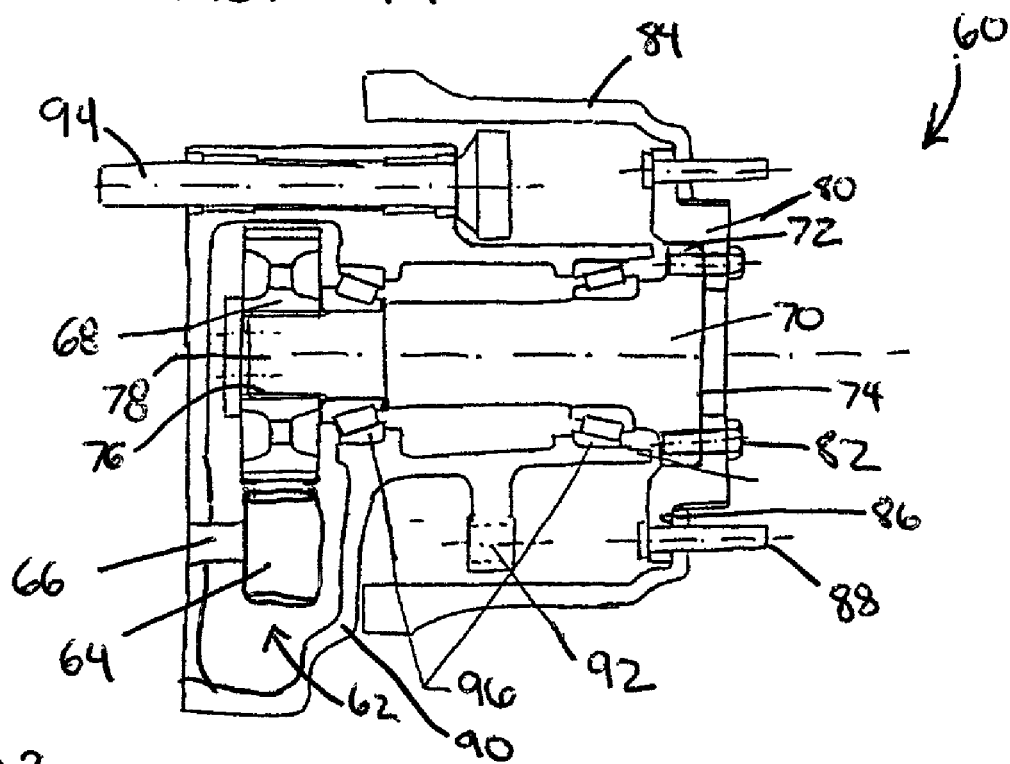
FIG. 2 is a cross-sectional view of a wheel end assembly incorporating the subject invention.

The subject invention provides a simplified wheel end assembly that reduces the overall number of bolted joints and bearings required to support rotating components. A preferred embodiment of a wheel end assembly 60 is shown in FIG. 2. In this embodiment, the wheel end assembly 60 includes a gear assembly 62 with an input gear 64 coupled to an input shaft 66 and an output gear 68 for driving an output wheel shaft 70. The gear assembly 62 also includes idler gears (not shown) as described above.

The wheel shaft 70 includes a flanged portion 72 at an outboard end 74 and a splined portion 76 at an inboard end 78. The output gear 68 is splined or similarly attached to the splined portion 76 and a wheel adapter 80 is directly mounted to the flanged portion 72 with a plurality of fasteners 82. A brake drum 84 is bolted to an outboard external face 86 of the adapter 80 with a plurality of fasteners 88.

The wheel shaft 70 is mounted for rotation relative to a combined gear/shaft housing 90 that substantially encloses the shaft 70 and gear assembly 62. A brake spider 92 is integrally formed with the gear/shaft housing 90 as one piece. The brake spider 92 supports a camshaft 94 as described above.

The wheel shaft 70 is solely supported by a pair of bearings 96. The bearings 96 directly engage the housing 90 and the wheel shaft 70. One of the bearings 96 supports the shaft 70 at the inboard end 78 near the output gear 68 and the other bearing 96 supports the shaft 70 at the outboard end 74 near the wheel adapter 80. The spider 92 is positioned within the internal cavity of the brake drum 84 between the bearings 96.

Thus, the subject invention provides a configuration where the output gear 68 and wheel adapter 80 are supported on a common shaft, i.e., the wheel shaft 70. The integrated housing design, in which the single piece housing 90 includes a gear housing portion, a shaft housing portion, and a brake spider portion, eliminates two (2) bolted joints. Further, this configuration requires only two (2) bearings 96 to support the shaft 70. The input and output gears 64, 68 are installed through an opening on the inboard side of the gear housing portion. Also, the need for a traditional wheel hub is eliminated because the wheel adapter 80 is directly mounted to the shaft 70.

Figure 3:
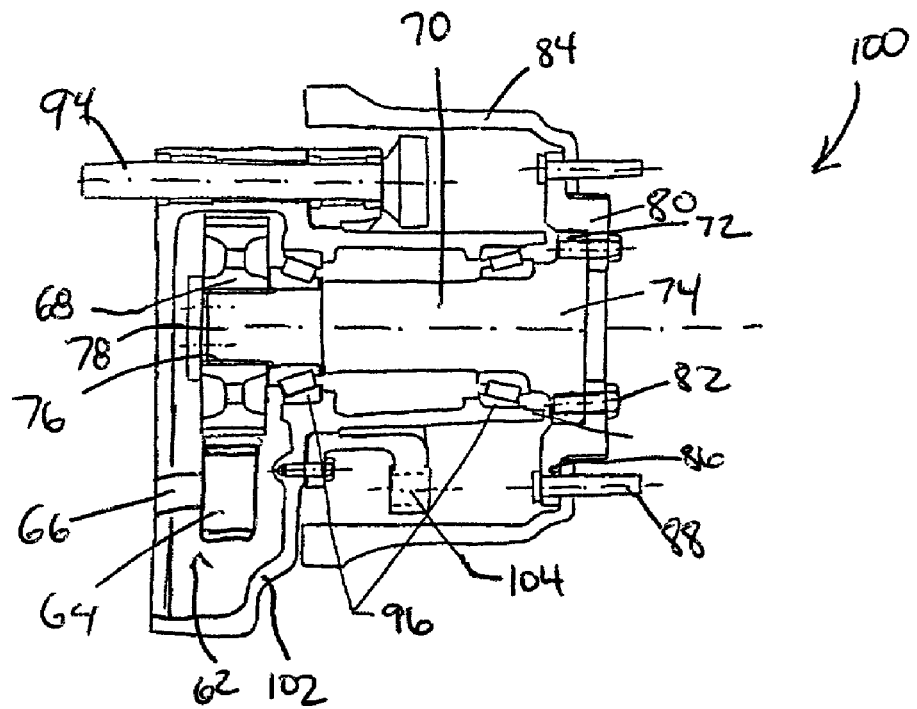
FIG. 3 is a cross-sectional view of an alternate embodiment of a wheel end assembly incorporating the subject invention.

An alternate embodiment of a wheel end assembly 100 is shown in FIG. 3. This embodiment is similar to that of FIG. 2 except that the wheel end assembly 100 includes a gear/shaft housing 102 and a brake spider 104 that is separately mounted to the gear/shaft housing 102. All of the other wheel end components are the same as that described above with regard to FIG. 2. The wheel end assembly 100 provides brake clocking flexibility.

Figure 4:
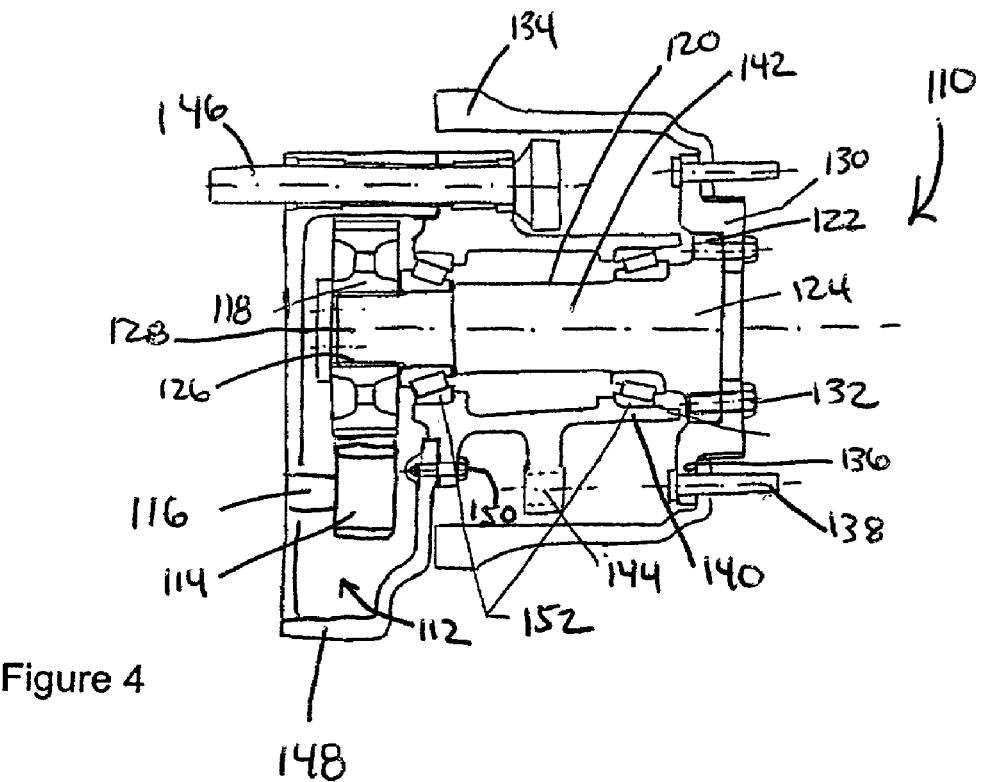
FIG. 4 is a cross-sectional view of an alternate embodiment of a wheel end assembly incorporating the subject invention.

An alternate embodiment of a wheel end assembly 110 is shown in FIG. 4. In this embodiment, the wheel end assembly 110 includes a gear assembly 112 with an input gear 114 coupled to an input shaft 116 and an output gear 118 for driving an output wheel shaft 120. The gear assembly 112 also includes idler gears (not shown) as described above.

The wheel shaft 120 includes a flanged portion 122 at an outboard end 124 and a splined portion 126 at an inboard end 128. The output gear 118 is splined or similarly attached to the splined portion 126 and a wheel adapter 130 is directly mounted to the flanged portion 122 with a plurality of fasteners 132. A brake drum 134 is bolted to an outboard external face 136 of the adapter 130 with a plurality of fasteners 138.

The wheel shaft 120 is mounted for rotation relative to a shaft housing 140 that substantially encloses a center portion 142 of the shaft 120. A brake spider 144 is preferably integrally formed with the shaft housing 140 as one piece. The brake spider 144 supports a camshaft 146 as described above. A gear housing 148 substantially encloses the gear assembly 112. The shaft housing 140 is bolted to the gear housing 148 with a plurality of fasteners 150 (only one is shown). This configuration allows the gears 114, 118 to be installed from an outboard end of the gear housing 148.

The wheel shaft 120 is solely supported by a pair of bearings 152. The bearings 152 directly engage the shaft housing 140 and the wheel shaft 120. One of the bearings 152 supports the shaft 120 at the inboard end 128 near the output gear 118 and the other bearing 152 supports the shaft 120 at the outboard end 124 near the wheel adapter 130. The spider 144 is positioned within the internal cavity of the brake drum 134 between the bearings 152.

Thus, wheel end assembly 110 provides a configuration where the output gear 118 and wheel adapter 130 are supported on a common shaft, i.e., the wheel shaft 120. Additionally, pair of bearings 152 installed between the shaft housing 140 and wheel shaft 120 provides the sole rotational support for the wheel shaft 120.

Figure 5:
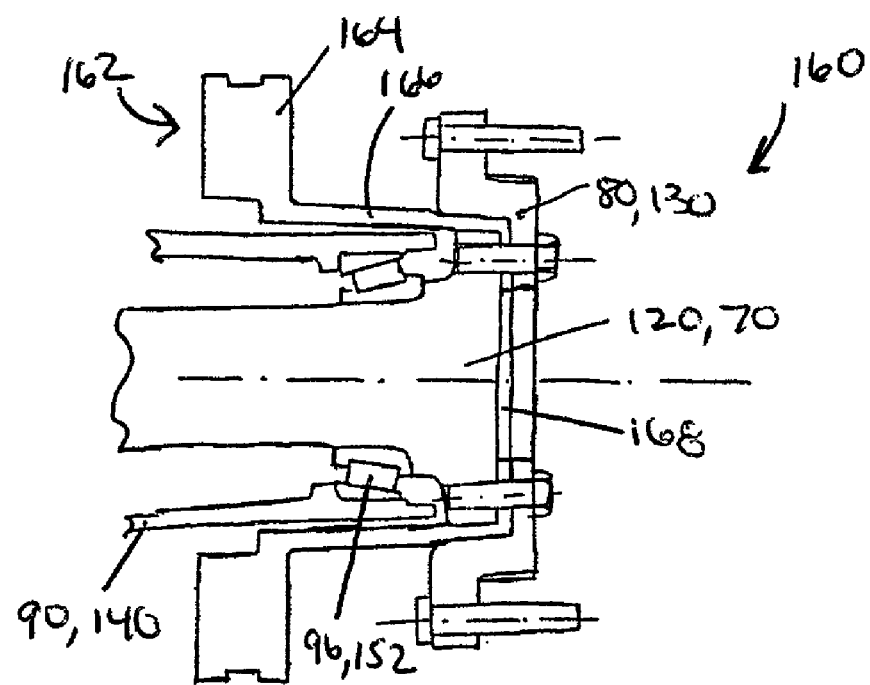
FIG. 5 is a cross-sectional view of an alternate embodiment of a wheel end assembly incorporating the subject invention.

An alternate embodiment of a wheel end assembly 160 is shown in FIG. 5. In this embodiment, the wheel assembly 160 includes a disc brake assembly 162 instead of a drum brake assembly as shown and described in FIGS. 1–4 above. The operation of disc brake assemblies is well known and will not be discussed in detail.

In this configuration, wheel end assembly includes a rotor 164 that is mounted for rotation with the wheel shaft 70, 120. It should be understood that the rotor 164 configuration can be utilized with either the combined gear/shaft housing 90, wheel shaft 70, and bearing 96 mounting configuration or can be utilized with the shaft housing 140, wheel shaft 120, and bearing 152 mounting configuration.

The rotor 164 includes a central cup-shaped portion 166 with a bottom portion 168 that is mounted between the flanged end of the shaft 70, 120 and the wheel adapter 80, 130. Thus, the rotor 164 is mounted outboard of the output shaft flange, which allows the rotor 164 to be serviced or replaced without affecting the bearings 96, 152.

The subject invention provides a simplified wheel end assembly for an inverted portal axle that reduces assembly time and overall cost. Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A vehicle wheel end assembly comprising:
   a non-rotating wheel component;
   an output shaft mounted for rotation relative to said non-rotating wheel component about an output axis;
   a gear assembly coupled to an input shaft and having an output gear for driving said output shaft;
   a wheel adapter attachable to a vehicle wheel wherein said output gear and said wheel adapter are directly supported on said output shaft; and
   a pair of bearings supporting said output shaft for rotation relative to said non-rotating wheel component, said pair of bearings being positioned axially between said wheel adaptor and said gear assembly along said output axis.

2. The vehicle wheel end assembly as set forth in claim 1 wherein said output shaft includes a flange extending out from said non-rotating wheel component at an outboard end, said wheel adapter being attached to said flange, and wherein said pair of bearings comprises an inboard bearing positioned outboard of said gear assembly and an outboard bearing positioned inboard of said flange.

3. The vehicle wheel end assembly as set forth in claim 1 including a brake rotor mounted for rotation with said output shaft, said brake rotor including a rotor mount portion positioned between said flange and said wheel adapter.

4. The vehicle wheel end assembly as set forth in claim 1 including a brake drum mounted for rotation with said output shaft, said brake drum including a drum mount portion mounted on an outboard face of said wheel adapter, said outboard face being outboard of said non-rotating wheel component.

5. The vehicle wheel end assembly as set forth in claim 1 including a brake spider formed integrally with said non-rotating wheel component as one piece.

6. The vehicle wheel end assembly as set forth in claim 1 wherein said non-rotating wheel component comprises a single piece housing portion with said pair of bearings directly engaging said output shaft and said single piece housing portion.

7. The vehicle wheel end assembly as set forth in claim 6 wherein said single piece housing portion comprises a single piece shaft housing that surrounds at least a central portion of said output shaft.

8. The vehicle wheel end assembly as set forth in claim 7 wherein said single piece shaft housing is integrally formed with a gear housing portion as one piece, said gear housing portion substantially enclosing said gear assembly.

9. The vehicle wheel end assembly as set forth in claim 7 wherein said single piece shaft housing is attached to a gear housing that substantially encloses said gear assembly.

10. The vehicle wheel end assembly as set forth in claim 1 wherein said gear assembly includes an input gear rotatable about an input axis spaced apart from said output axis, said input axis and said output axis being generally parallel to each other.

11. The vehicle wheel end assembly as set forth in claim 10 wherein an inboard bearing of said pair of bearings directly abuts against said output gear.

12. A vehicle wheel end assembly comprising:
    a non-rotating wheel component;
    an output shaft mounted for rotation relative to said non-rotating wheel component;
    a gear assembly coupled to an input shaft and having an output gear for driving said output shaft, wherein said non-rotating wheel component comprises a housing substantially enclosing said gear assembly and said output shaft;
    a wheel adapter attachable to a vehicle wheel, wherein said output gear and said wheel adapter are directly supported on said output shaft;
    a brake drum mounted for rotation with said output shaft, said brake drum including a drum mount portion mounted on an external face of said wheel adapter; and
    a brake spider mounted to said housing and positioned substantially within said brake drum.

13. A vehicle wheel end assembly comprising:
    a housing;
    an output shaft having a flange formed at an outboard end, said output shaft being solely supported for rotation relative to said housing by a pair of bearings;
    a gear assembly for transferring driving input to an output gear in direct driving engagement with an inboard end of said output shaft; and
    a wheel adapter mounted to said flange wherein said pair of bearings comprises an inboard bearing positioned on said output shaft outboard of said sear assembly and an outboard bearing positioned on said output shaft inboard of said flange.

14. The vehicle wheel end assembly as set forth in claim 13 wherein said housing includes a first portion substantially surrounding said gear assembly and a second portion substantially surrounding at least a center portion of said output shaft, said first and second portions being integrally formed as one piece, and wherein said inboard and outboard bearings are supported directly between said second portion and said output shaft.

15. The vehicle wheel end assembly as set forth in claim 14 including a brake spider mounted to said first portion.

16. The vehicle wheel end assembly as set forth in claim 14 including a brake spider integrally formed with said first and second portions as one piece.

17. The vehicle wheel end assembly as set forth in claim 13 wherein said housing comprises a shaft housing substantially surrounding a center portion of said output shaft and including a brake spider portion integrally formed with said shaft housing as one piece.

18. The vehicle wheel end assembly as set forth in claim 17 including a gearbox housing substantially enclosing said gear assembly, said gearbox housing being mounted to an inboard end of said shaft housing, and wherein said inboard and outboard bearings are directly supported between said output shaft and said shaft housing.

19. The vehicle wheel end assembly as set forth in claim 13 wherein an inboard face of said inboard bearing abuts against an outboard face of said gear assembly.

20. The vehicle wheel end assembly as set forth in claim 13 wherein said gear assembly comprises an input gear rotatable about an input axis and an output gear rotatable about an output axis spaced apart from said input axis, with said input axis and said output axis being generally parallel to each other.

21. The vehicle wheel end assembly as set forth in claim 13 wherein said housing comprises a single piece housing portion with said inboard and outboard bearings directly engaging said output shaft and said single piece housing portion.

22. The vehicle wheel end assembly as set forth in claim 21 wherein said single piece housing portion surrounds a center portion of said output shaft.

* * * * *

UNITED STATES PATENT AND TRADEMARK OFFICE
CERTIFICATE OF CORRECTION

| | | |
|---|---|---|
| PATENT NO. | : 7,204,339 B2 | |
| APPLICATION NO. | : 10/153121 | |
| DATED | : April 17, 2007 | |
| INVENTOR(S) | : Varela et al. | |

It is certified that error appears in the above-identified patent and that said Letters Patent is hereby corrected as shown below:

Claim 13, Column 6, line 22: "sear" should read as --gear--

Signed and Sealed this

Seventh Day of August, 2007

JON W. DUDAS
*Director of the United States Patent and Trademark Office*